(12) United States Patent
Bose et al.

(10) Patent No.: US 11,475,274 B2
(45) Date of Patent: Oct. 18, 2022

(54) PARAMETER CRITICALITY-AWARE RESILIENCE

(71) Applicant: International Business Machines Corporation, Armonk, NY (US)

(72) Inventors: Pradip Bose, Yorktown Heights, NY (US); Alper Buyuktosunoglu, White Plains, NY (US); Augusto J. Vega, Mount Vernon, NY (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 15/493,263

(22) Filed: Apr. 21, 2017

(65) Prior Publication Data

US 2018/0307968 A1 Oct. 25, 2018

(51) Int. Cl.
*G06N 3/04* (2006.01)
*G06N 3/08* (2006.01)
*G06N 3/10* (2006.01)

(52) U.S. Cl.
CPC ......... *G06N 3/0445* (2013.01); *G06N 3/0472* (2013.01); *G06N 3/08* (2013.01); *G06N 3/082* (2013.01); *G06N 3/105* (2013.01)

(58) Field of Classification Search
CPC .... G06N 3/105; H03M 13/096; G06K 9/6219
See application file for complete search history.

(56) References Cited

U.S. PATENT DOCUMENTS

| 5,588,091 | A | * | 12/1996 | Alkon | G06V 10/454 706/31 |
| 5,636,326 | A | | 6/1997 | Stork et al. | |
| 5,822,742 | A | * | 10/1998 | Alkon | G06K 9/4628 706/31 |
| 8,160,847 | B2 | | 4/2012 | Solomon | |

(Continued)

FOREIGN PATENT DOCUMENTS

JP 3804364 B2 8/2006

OTHER PUBLICATIONS

'Energy vs. Reliability Trade-offs Exploration in Biomedical Ultra-Low Power Devices': Duch, 2016, 2016 Design, Automation & Test in Europe Conference & Exhibition (Date).*

(Continued)

*Primary Examiner* — Michael J Huntley
*Assistant Examiner* — Peter D Coughlan
(74) *Attorney, Agent, or Firm* — Aaron N. Pontikos

(57) ABSTRACT

A computer-implemented method optimizes a neural network. One or more processors define layers in a neural network based on neuron locations relative to incoming initial inputs and original outgoing final outputs of the neural network, where a first defined layer is closer to the incoming initial inputs than a second defined layer, and where the second defined layer is closer to the original outgoing final outputs than the first defined layer. The processor(s) define parameter criticalities for parameter weights stored in a memory used by the neural network, and associate defined layers in the neural network with different memory banks (Continued)

based on the parameter criticalities for the parameter weights. The processor(s) store parameter weights used by neurons in the first defined layer in the first memory bank and parameter weights used by neurons in the second defined layer in the second memory bank.

15 Claims, 9 Drawing Sheets

(56) References Cited

U.S. PATENT DOCUMENTS

| | | | |
|---|---|---|---|
| 9,002,682 B2 | 4/2015 | Kasabov | |
| 2002/0143720 A1* | 10/2002 | Anderson | G06N 3/105 706/26 |
| 2010/0172179 A1* | 7/2010 | Gorobets | G06F 12/0246 365/185.09 |
| 2011/0066580 A1* | 3/2011 | Tsai | G06N 3/08 706/25 |
| 2013/0041859 A1* | 2/2013 | Esterlilne | G06N 3/02 706/25 |
| 2013/0212053 A1* | 8/2013 | Yagi | G06K 9/6229 706/31 |
| 2014/0181532 A1 | 6/2014 | Camp | |
| 2015/0134424 A1* | 5/2015 | Matzlavi | G06Q 10/0637 705/7.36 |
| 2015/0161987 A1* | 6/2015 | Horesh | G10L 15/063 704/232 |
| 2015/0331741 A1 | 11/2015 | Park et al. | |
| 2016/0028544 A1* | 1/2016 | Hyde | H04L 9/0869 380/44 |
| 2016/0253238 A1 | 9/2016 | Strauss et al. | |
| 2016/0379109 A1* | 12/2016 | Chung | G06F 15/7803 706/26 |

OTHER PUBLICATIONS

'Elements of Artificial Neural Networks' Mehrotra, 1997, MIT press.*

'An Introduction to Convolutional Neural Networks': OShea, 2015, arxiv:1511.08458v2.*

P. Mell et al., "The NIST Definition of Cloud Computing", National Institute of Standards and Technology, Information Technology Laboratory, Sep. 2011, pp. 1-7.

Le Cun et al., "Optimal Brain Damage". Advances in Neural Information Processing Systems 2, Morgan Kaufmann Publishers Inc. San Francisco, CA, USA (1990), pp. 598-605.

Chung et al., "Simplifying deep neural networks for neuromorphic architectures". Proceedings of the 53rd Annual Design Automation Conference, Article No. 126, Austin, TX, US, Jun. 5-9, 2016. (Abstract Only).

Han et al., "Learning both weights and connections for efficient neural networks". Proceedings of the 28th International Conference on Neural Information Processing Systems, Montreal, Canada, Dec. 7-12, 2015, pp. 1135-1143. (Abstract Only).

Han et al., "Deep Compression: Compressing Deep Neural Networks with Pruning, Trained Quantization and Huffman Coding". Published as a conference paper at ICLR 2016 (oral), Oct. 1, 2015. (Abstract Only).

Hanson et al., "Comparing biases for minimal network construction with back-propagation". Proceedings of the 1st International Conference on Neural Information Processing Systems, MIT Press Cambridge, MA, USA (1988), pp. 177-185. (Abstract Only).

Hassibi et al., "Second Order Derivatives for Network Pruning: Optimal Brain Surgeon". Advances in Neural Information Processing Systems 5, Nov. 30-Dec. 3, 1992, pp. 164-171.

Uhlig et al., "Critical dynamics in associative memory networks". Frontiers in Computational Neuroscience, vol. 7 Issue 87, Jul. 24, 2013.

Nikko Strom, "Phoneme Probability Estimation with Dynamic Sparsely Connected Artificial Neural Networks". The Free Speech Journal, Issue 5, Oct. 22, 1997.

* cited by examiner

PARAMETER CRITICALITY-AWARE RESILIENCE

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights in this invention.

BACKGROUND

The present invention relates generally to the field of computers. Still more particularly, the present invention relates to the field of computer support for neural networks.

SUMMARY

In a computer-implemented method embodiment of the present invention, one or more processors define: layers in a neural network based on neuron locations relative to an initial input and a final output of the neural network, where a first layer is closer to the initial input than a second layer, and where the second layer is closer to the final output than the first layer; and parameter criticalities to parameters based on the parameter locations relative to the initial input and the final output. The processor(s) associate defined layers in the neural network with portions of memory based on defined parameter criticalities, where the first layer is assigned a first portion of memory that is more error-prone than a second portion of memory that is assigned to the second defined layer. The processor(s) store parameter weights used by neurons associated with the first layer in the first portion of memory and parameter weights used by neurons associated with the second layer in the second portions of memory.

Other embodiments of the present invention include a computer system and a computer program product.

DETAILED DESCRIPTION

By way of introduction and overview only, a neural network with regard to some embodiments of the present invention refers to a computer architecture that emulates biological neural networks. That is, a biological neural network (e.g., a human brain) is made up of biological neurons that communicate with one another bioelectrically. A biological neuron has dendrites that are connected to a soma, which combines bioelectric signals from the dendrites. These combined bioelectric signals are then transmitted along an axon, which terminates at an axon terminal. Neurotransmitters then pass the bioelectric signals across a synapse from the axon terminal to the dendrites of a next neuron.

An electronic neural network uses an architecture that is conceptually similar to that of a biological neural network. However, the "neurons" in an electronic neural network are made up of electronic components, and these electronic neurons use electronic (instead of bioelectric) signals. If the electronic neural network includes multiple hidden layers of neurons between the input and output layers of the electronic neural network, then such an electronic neural network is referred to as a deep neural network (DNN).

Figure 1:
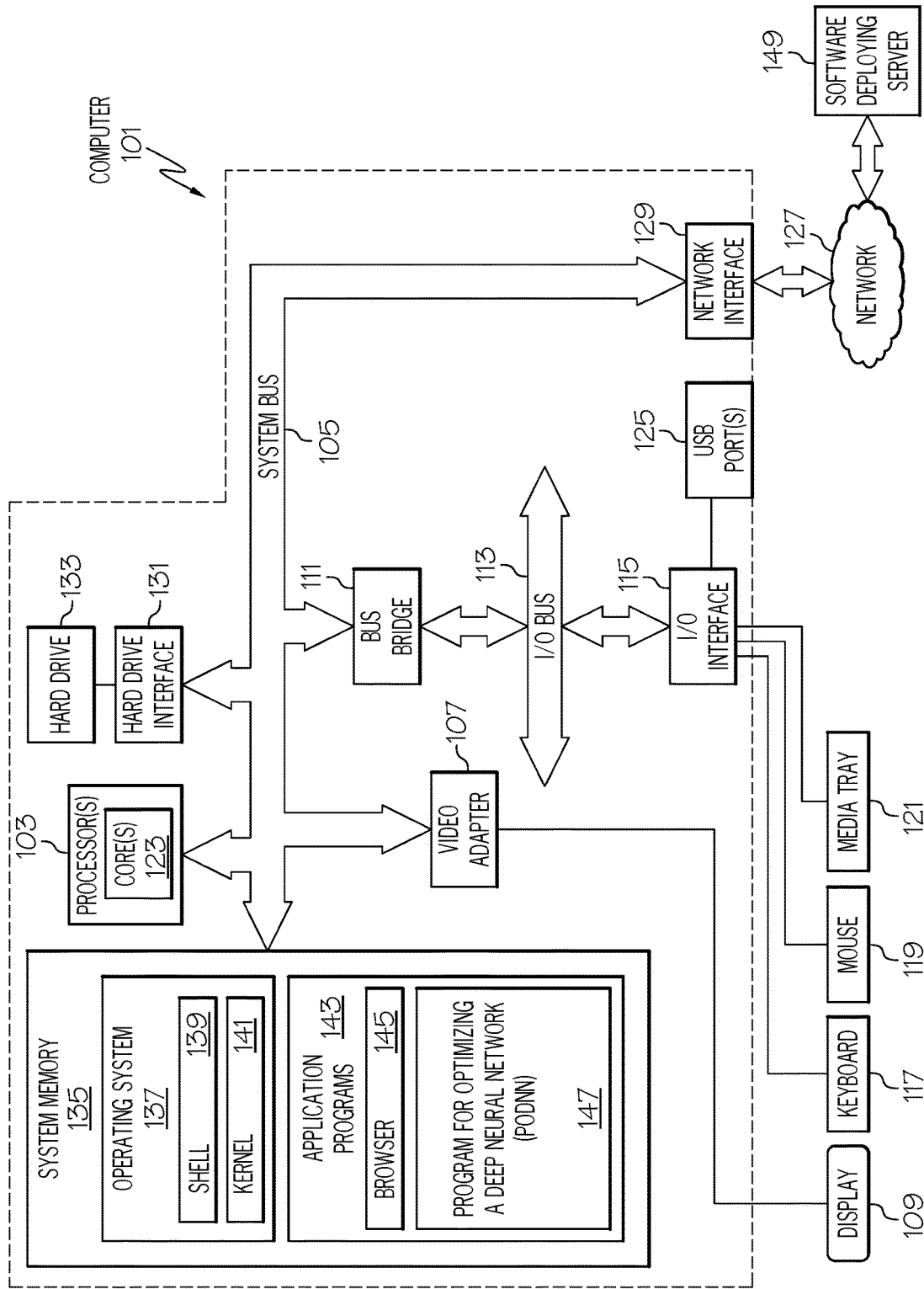
FIG. 1 depicts an exemplary system and network in accordance with one or more embodiments of the present invention.

With reference now to the figures, and in particular to FIG. 1, a block diagram of an exemplary system and network in accordance with one or more embodiments of the present invention is depicted. In some embodiments, part or all of the exemplary architecture, including both depicted hardware and software, shown as associated with and/or within computer 101 can be downloaded from and/or implemented by software deploying server 149.

With further reference to FIG. 1, exemplary computer 101 includes processor(s) 103, operably coupled to a system bus 105, which further operably couples various internal and external components. Processor(s) 103 may embody or use one or more processor core(s) 123. A video adapter 107, which drives/supports a display 109, is also coupled to system bus 105.

System bus 105 is coupled via a bus bridge 111 to an input/output (I/O) bus 113. An I/O interface 115 is coupled to I/O bus 113. I/O interface 115 enables communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or classroom resource(s) 151 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 may include one or more wireless networks, such as a Wi-Fi network, and/or cellular networks. An example embodiment of the present invention utilizes a network "cloud" environment, which will be discussed with reference to FIG. 8 and FIG. 9.

Referring again to FIG. 1, a hard drive interface 131 is also coupled to system bus 105. Hard drive interface 131 interfaces with a hard drive 133. In some embodiments, hard drive 133 is a non-volatile form of memory for storing and populating system memory 135 (e.g., a volatile form of memory, such as so-called random access memory (RAM)), which is also coupled to system bus 105.

In some embodiments, system memory may be considered a lowest level of volatile memory in computer 101. System memory 135 may include additional, higher levels of volatile memory (not shown), including, but not limited to, cache memory, registers and buffers. Logic and/or data (not depicted) residing in system memory 135 can include or be associated with operating system (OS) 137 and application programs 143. In some embodiments, part or all of system memory 135 can be shared and/or distributed across one or more systems. In some embodiments, application programs 143 may be distributed across one or more software deploying servers 149 or other systems.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 can include a renderer, shown in exemplary manner as a browser 145. Browser 145 includes program modules and instructions (not depicted) enabling a World Wide Web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 include a Program for Optimizing a Deep Neural Network (PODNN) 147. In this example, PODNN 147 includes program instructions (software) adapted for implementing processes and/or functions in accordance with the present invention, such as (without limitation) those described with reference to FIGS. 2-7. In some embodiments, PODNN 147 is downloaded from software deploying server 149, (on-demand or "just-in-time") e.g., where the PODNN 147 software is not downloaded until needed for execution. In some embodiments of the present invention, software deploying server 149 can perform one or more functions associated with the present invention (including execution of PODNN 147), thus freeing computer 101 from having to use its internal computing resources.

The elements depicted in computer 101 are not intended to be exhaustive, but rather are representative to highlight certain components in accordance with example embodiments of the present invention. For instance, computer 101 may include alternate memory storage devices such as flash memory, magnetic cassettes, digital versatile disks (DVDs), Bernoulli cartridges, etc. These and other variations are intended to be within the spirit and scope of the present invention.

Figure 2:
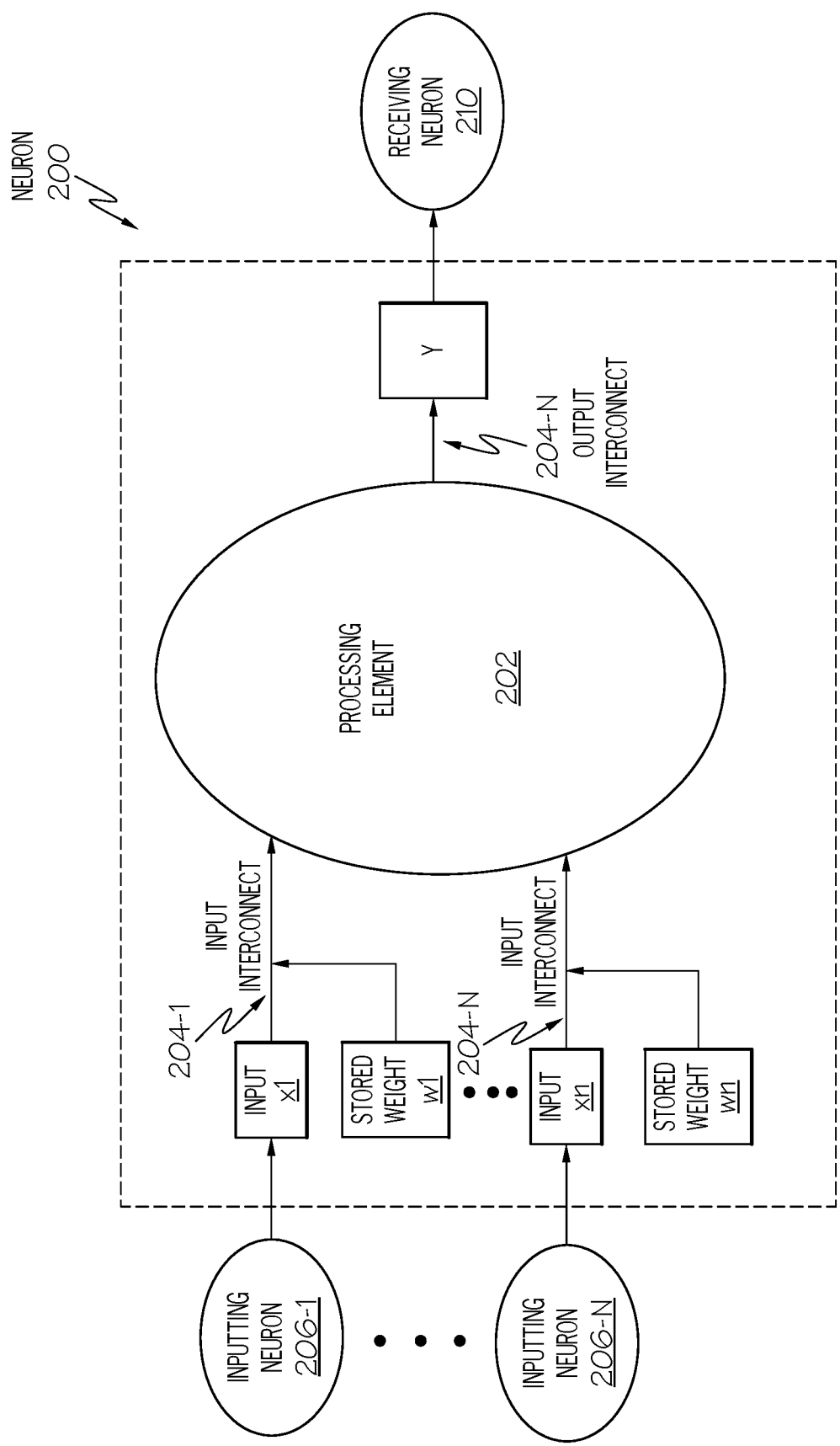
FIG. 2 illustrates exemplary aspects of a neural network in accordance with one or more embodiments of the present invention.

With reference now to FIG. 2, an exemplary neuron 200 used in a DNN is depicted.

As depicted, neuron 200 has a processing element 202 (e.g., a processor such as one of the processor(s) 103 shown in FIG. 1), which can be analogous to the soma in a biological neuron in that it combines depicted inputs $x_1$-$x_n$ and stored weights $w_1$-$w_n$ received from respective input interconnects 204-1 and 204-$n$, which are analogous to the dendrites founds in a biological neuron. That is, electronic signals from inputting neurons 206-1 and 206-$n$ are sent as respective inputs $x_1$-$x_n$ to the processing element 202 via respective input interconnects 204-1 and 204-$n$. These inputs $x_1$-$x_n$ are associated with (e.g., multiplied by) respective stored weights $w_1$-$w_n$, which are known as "parameters" in a DNN.

The processing element 202 then processes the weighted inputs $x_1$ through $x_n$. In some embodiments, processing element 202 sums up the values of the weighted inputs $x_1$ through $x_n$. However, in some embodiments, processing element 202 processes the weighted inputs $x_1$-$x_n$ using a more complex logistic function, such as a sigmoidal function. For example, processing element 202 may first sum up the weighted inputs to generate "$z$", such that:

$$z = x_1 w_1 + \ldots x_n w_n$$

The processing element 202 may then calculate a value for "y", such that:

$$y = \frac{1}{1 = e^{-z}}$$

Thus, y is a value between 0 and 1. When the weighted sum z is very negative, the value of y is very close to 0. When the weighted sum z is very large and positive, the value of y is very close to 1. Thus, such sigmoidal neurons are more useful than linear neurons since they provide outputs that are more binary, and thus are more useful in learning algorithms.

Returning now to FIG. 2, once processing element 202 has processed the weighted inputs $x_1$ through $x_n$, the output (i.e., y) is sent via an output interconnect 208 (analogous to an axon in a biological neuron) to a receiving neuron 210 (e.g., as inputs to the receiving neuron 210).

A deep neural network (DNN) may have numerous hidden neurons and numerous input neurons. An example will be discussed with reference to FIG. 3.

Figure 3:
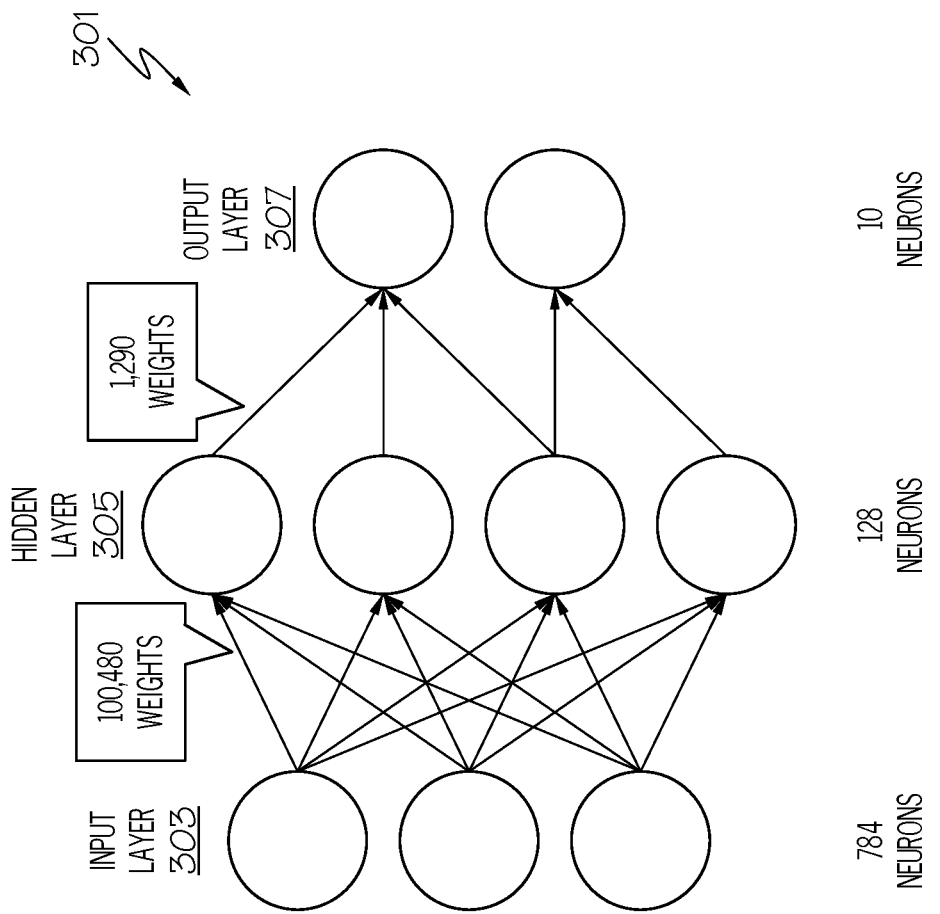
FIG. 3 depicts another example of aspects of a neural network in accordance with one or more embodiments of the present invention.

FIG. 3 depicts an example of aspects of a neural network in accordance with one or more embodiments of the present invention. As depicted, DNN 301 includes input neuron layer 303, hidden neuron layer 305, and output neuron layer 307.

In some embodiments and by way of example only, DNN 301 may be used to interpret handwriting by comparing handwriting inputs to the Modified National Institute of Standards and Technology (MNIST) database of handwritten digits. By way of further example only, assume further that shapes of parts of handwritten figures are captured as inputs depicted in input layer 303. For purposes of this example only, assume that input layer 303 has 784 neurons, 128 neurons in hidden layer 305 and 10 neurons in the output layer 307. However, since there are numerous different connections between the 784 neurons in input layer 303 and the 128 neurons in the hidden layer 305, each of these connections has one or more weights $w_1$-$w_n$. For purposes of this example only, assume that there are 100,480 weights associated with such connections.

There are relatively smaller number of connections between the number of neurons in the hidden layer 305 and the smaller number of neurons in the output layer 307 (10 in this example). A (non-limiting) example of an output layer is the layer that outputs an "answer" e.g., an interpretation of what figures the inputs actually depict. Accordingly, there are fewer weights associated with such connections (1,290 in this example). Thus, due to factors such as redundancy, numerousness, etc., each of the weights associated with neurons associated with the input layer 303 are individually less important than each of the weights associated with hidden layer 305, which are individually less important than each of the weights associated with the output layer 307. That is, neurons and their respective weights in different layers of the DNN 301 contribute differently to the outcome of the network. Specifically, those neurons in layers closer to the input have a lower impact on the model's output as compared to neurons in the layers farther from the input.

In another example, in the context of image processing, an input neuron may fail to accurately detect a tiny portion of the input image and the model's output may still be correct. In contrast, errors in output neurons may be more likely to result in completely wrong outcomes. Some embodiments of the present invention utilize this to exploit differences in error resilience across memory cells (e.g. due to low-voltage operation) for the benefit of power savings. That is, some embodiments of the present invention store weights (parameters) that are more immune to errors (i.e., parameters whose faulty operation will have less of an effect on the DNN output) in more error-prone, low-power memory cells, and store weights (parameters) for neurons that are believed to be less immune to error (e.g., by virtue of being closer to the output) in more resilient (less error-prone), high-power memory cells.

Figure 4:
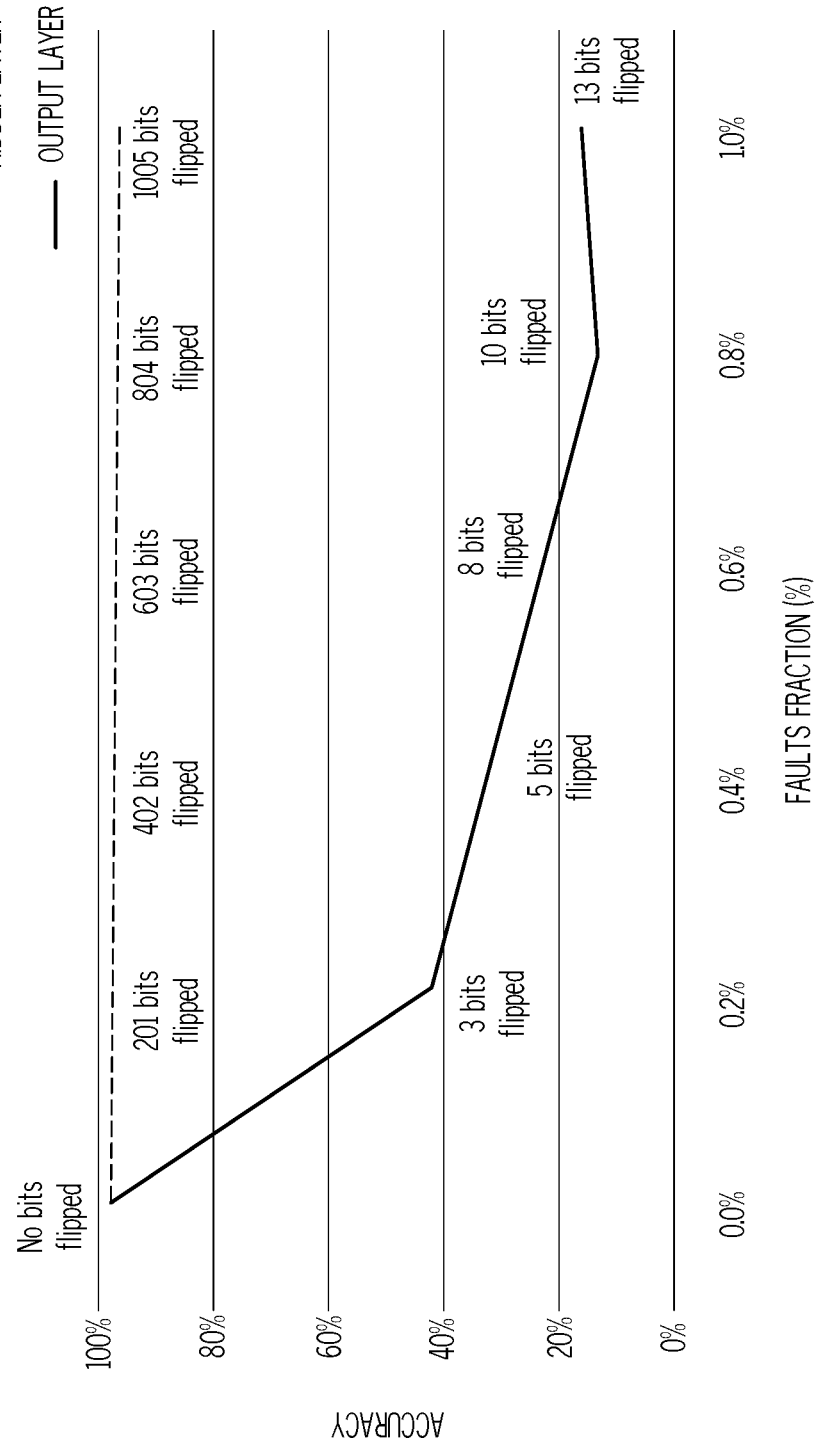
FIG. 4 illustrates an exemplary effect by neurons in a neural network in accordance with one or more embodiments of the present invention.

FIG. 4 depicts an exemplary effect by neurons in a neural network in accordance with one or more embodiments of the present invention. By way of overview to FIG. 4, flipping bits (i.e., changing the value of bits) in various inputs and/or weights with regard to different layers of a DNN has different effects on the output answer. For example, consider lines 402 and 404 as depicted in FIG. 4, which both represent a decreasing percentage of output accuracy as an increasing number of bits are flipped. As shown in line 402, in order to cause a 1% error rate in the DNN 301 shown in FIG. 3, 1005 bits must be flipped in the hidden layer 305. However, as shown in line 404 in FIG. 4, if only 13 bits are flipped in the output layer 307 shown in FIG. 3, then a 1% error rate will occur. Therefore, bit flipping needs to be minimized for neurons in the output layer 307, since a relatively small number of flipped bits will result in a relatively high percentage of error and decrease of accuracy (as compared to line 402). In order to achieve this, in some embodiments, inputs and/or weights are stored in more stable memory cells for the use of neurons in the output layer 307. However, this comes at a power expense, as described below.

Figure 5:
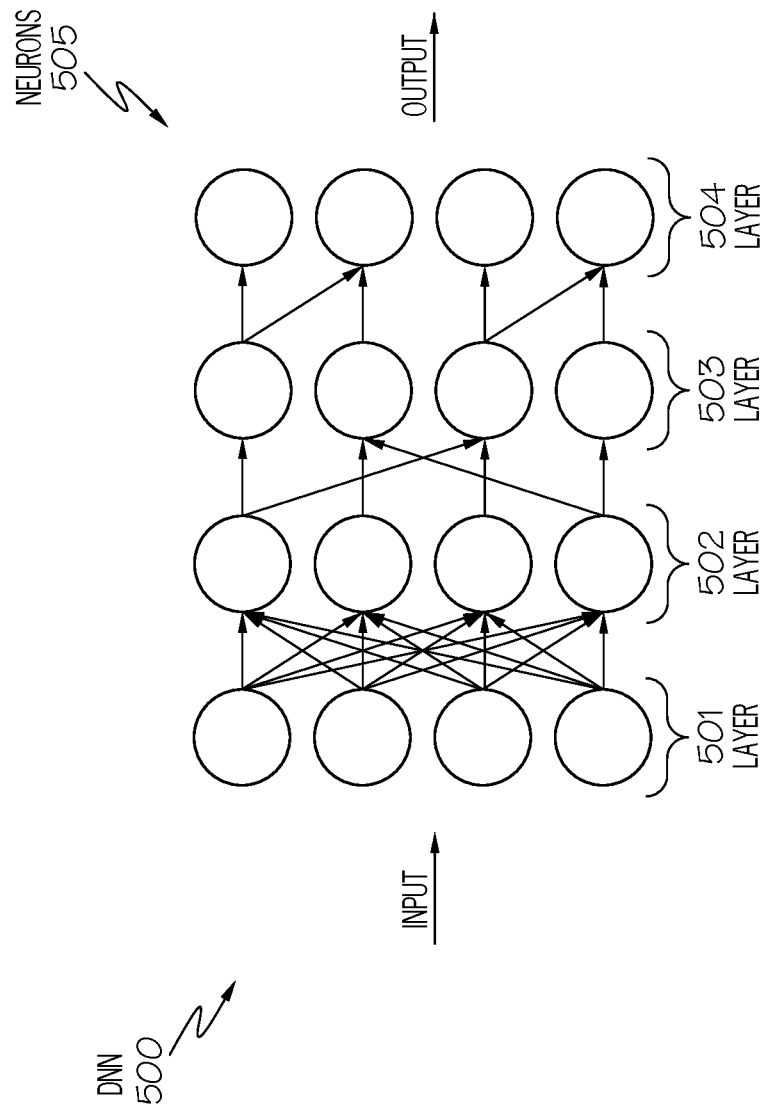
FIG. 5 depicts exemplary layers of a neural network in accordance with one or more embodiments of the present invention.

FIG. 5 depicts exemplary layers of a neural network in accordance with one or more embodiments of the present invention. As depicted, DNN 500 has four layers of neurons 505, identified as layers 501, 502, 503, and 504. In the example depicted, the neurons in layer 501 are closest to original inputs. A non-limiting example of such inputs are those from a set of handwritten figures. Referring again to FIG. 5, for purposes of this example only, assume that the neurons in layers 502-503 are "hidden", and the neurons in layer 504 provide the output (e.g., the actual content of the handwritten figures) of the DNN 500.

For purposes of this example only, further assume that the weights of the neurons in layer 501 are not very important, since 1) there are many more neurons in layer 501 than in other layers 502-504, and thus 2) there is overlapping functionality and/or 3) inconsequential operations associated with each of the neurons in layer 501. That is, assume that the input into layer 501 is a collection of parts of a handwritten figure. Assume that this collection of inputs is made up of hundreds of sections of the same handwritten figure, such that the DNN 500 will be able to identify the handwritten figure based on a portion of the sections. Therefore, individual sections of the handwritten figure are generally less important.

However, these portions are then consolidated into words in layers 502-503. Assume further that layers 502-503 have fewer neurons than layer 501. The operation performed by each neuron in layers 502-503 may be considered more important, since 1) there is less redundancy and 2) each operation defines a more significant portion of the handwriting (according to the current example).

The final output is generated by the neurons of layer 504, which identifies the content of the handwritten figure. Layer 504 has even fewer neurons, and thus each neuron and its associated resources are more critical than neurons/resources in the previous layers 501-503.

As such, neurons that require precise weights and other resources are assigned stable (error-free) resources, while neurons that do not require such precision are assigned less stable (error-prone) resources.

Figure 6:
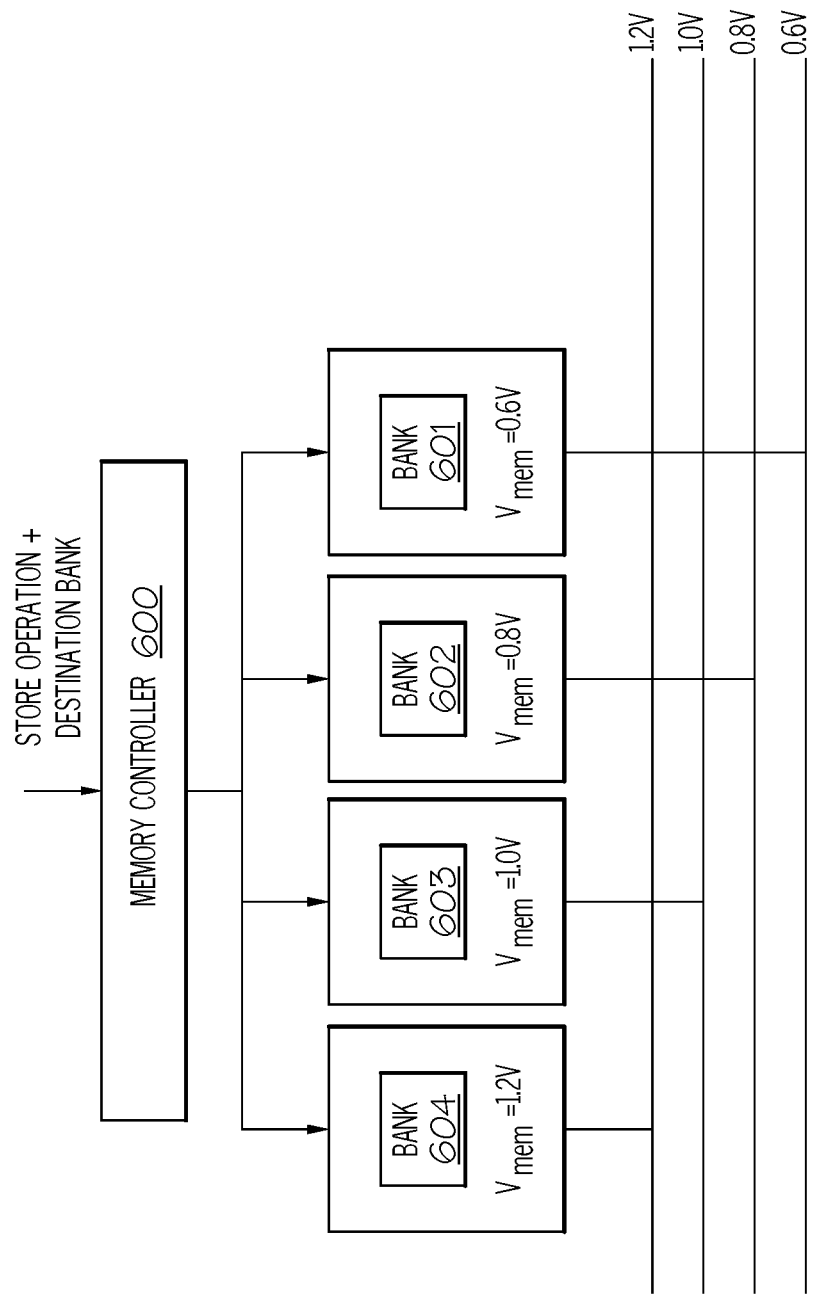
FIG. 6 illustrates exemplary aspects of a neural network system in accordance with one or more embodiments of the present invention.

FIG. 6 depicts exemplary aspects of a neural network system in accordance with one or more embodiments of the present invention. As depicted, in this example a system (e.g., computer 101 shown in FIG. 1) includes a memory controller 600, which controls one or more exemplary memory banks 601-604 that are available to DNN 500 (FIG. 5). Assume that memory bank 604 is very stable (i.e., is error-free), but uses a lot of power (1.2V). Assume further that memory bank 603 uses less power (1.0V) than memory bank 604, but at the expense of being less stable (i.e., is more error-prone than memory bank 604). Similarly, memory bank 602 is even more error-prone (but uses even less power—0.8V), than memory bank 603 and memory bank 601 is still more error-prone (but uses still less power—0.6V) than memory bank 602.

As discussed with reference to FIG. 5, parameter weights are less important for neurons in DNN 500 (FIG. 5) that are closer to the inputs, whereas parameter weights are more important for neurons in DNN 500 that are closer to the outputs. Referring now to FIGS. 5 and 6, memory controller 600 will store and retrieve parameter weights used by neurons in layer 501 (FIG. 5) in memory bank 601. Furthermore, memory controller 600 will store and retrieve parameter weights used by neurons in layer 502 in memory bank 602, while parameter weights used by neurons in layer 503 are stored in memory bank 603 and parameter weights used by neurons in layer 504 are stored in memory bank 604.

Thus, some embodiments of the present invention determine which parameters (weights) are relatively more critical to the operation of the DNN and which parameters/weights are relatively less critical, and treat them differently by storing them in memory banks that are correspondingly less or more error-prone (with the advantage of using memory that uses less power when precision is not critical).

Figure 7:
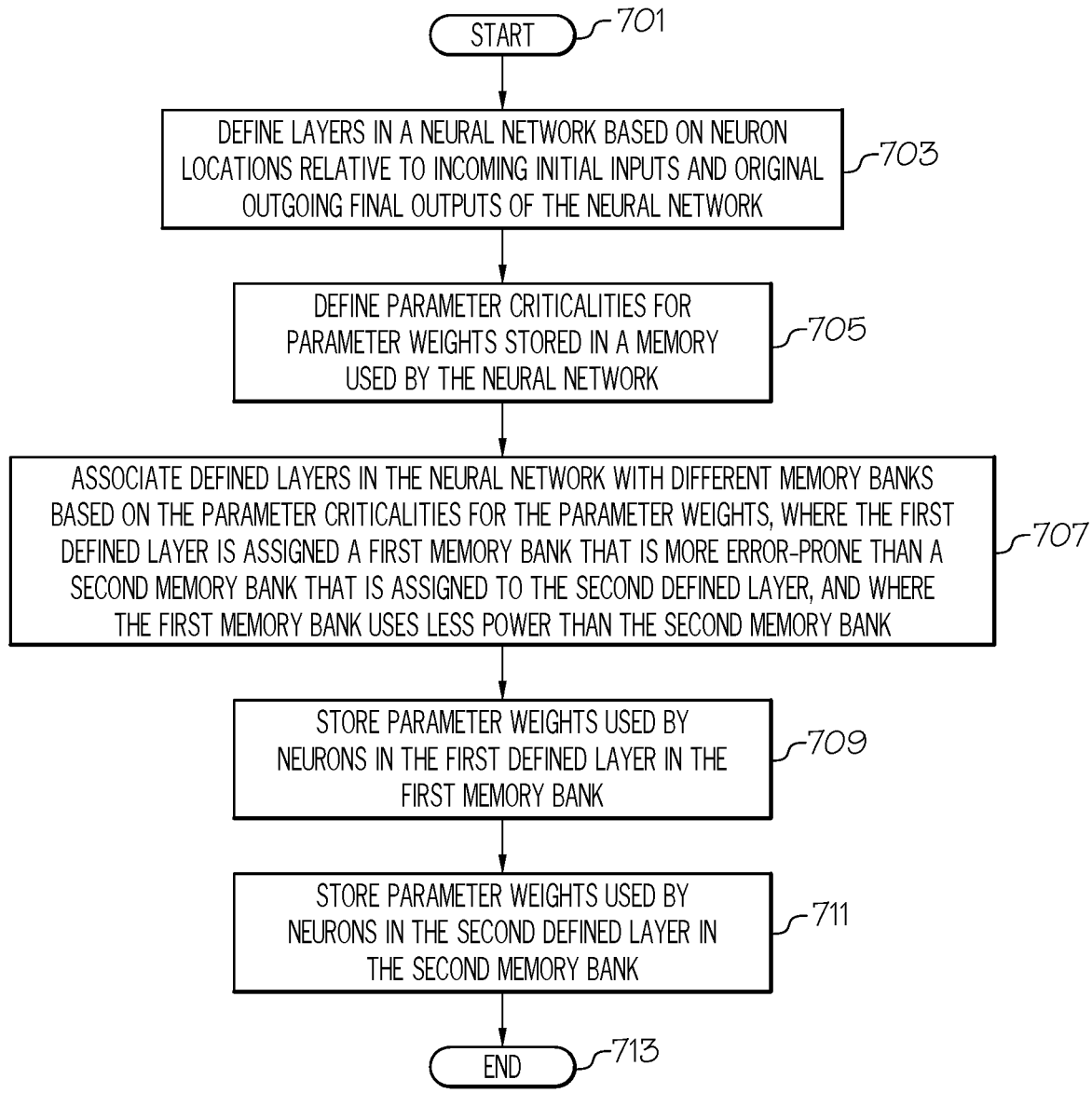
FIG. 7 depicts an exemplary method in accordance with one or more embodiments of the present invention.

FIG. 7 depicts an exemplary method in accordance with one or more embodiments of the present invention. By way of overview, the term "error-prone" as used in this example refers to error occurrences that exceed a predetermined percentage. For example, if a stored weight from memory in a certain memory bank is corrupted more than 1% of the time, then it is deemed to be "error-prone". However, if a stored weight from memory in a certain memory bank is corrupted less than 0.01% of the time, then that memory is deemed to be "error-free".

As depicted in FIG. 7, after initiator (start) block 701 the method proceeds to block 703. In block 703, one or more processors (e.g., processor(s) 103 shown in FIG. 1) define layers (e.g., layers 501-504 shown in FIG. 5) in a neural network (e.g., DNN 500). By way of example only, the layers can be defined based on neuron locations relative to incoming initial inputs and original outgoing final outputs of the neural network. Referring again to the example shown in FIG. 5, a first defined layer (e.g., layer 501) is closer to the incoming initial inputs than a second defined layer (e.g., layer 502 or layer 503 or layer 504), and the second defined layer is closer to the original outgoing final outputs (e.g., coming out of layer 504) than the first defined layer.

In block 705, one or more processors define parameter criticalities for parameter weights stored in a memory used by the neural network. These parameter criticalities define impacts of parameter weights on the original outgoing final outputs. For example, assume that the parameter shown in FIG. 2 as stored weight $w_1$ has little impact on the outputy shown FIG. 2 (assuming that y is one of the final outputs from the DNN 500 shown in FIG. 5). Assume further that the parameter shown in FIG. 2 as stored weight $w_n$ has a relatively greater impact on the output y. As such, the criticality of parameter $w_n$ is greater than the parameter criticality of $w_1$.

Referring again to FIG. 7, in block 707, one or more processors associate the defined layers of the neural network with different memory banks based on the parameter criticalities for the parameter weights. For example, different layers in a DNN are assigned to different memory banks according to their respective significance. By way of further example (with reference now to FIGS. 5-6), a first defined layer (e.g., layer 501 in FIG. 5) is assigned to a first memory bank (e.g., bank 601 in FIG. 6) that is more error-prone than a second memory bank (e.g., bank 604) that is assigned to the second defined layer (e.g., layer 504). As shown in FIG. 6, the first memory bank uses less power than the second memory bank. As such, bank 601 uses less power than bank 604, thus saving power used by DNN 500.

Referring again to FIG. 7, in block 709 (FIG. 7), one or more processors store the parameter weights used by neurons in the first defined layer in a first (lower powered) memory bank.

In block 711, one or more processors correspondingly store parameter weights used by neurons in the second defined layer in a second (higher powered) memory bank.

The flow chart ends at terminator block 713.

In some embodiments of the present invention, one or more processors identify error-prone processing elements (e.g., processing element 202 shown in FIG. 2) and interconnects (e.g., input interconnects 204-1 and 204-n and output interconnect 208) used in the first defined layer of the neural network. The term error-prone is defined as having a history of experiencing an error more than a predefined percentage of occurrences.

For example, if processing element 202 outputs an incorrect value for y once every 100 transactions (i.e., a 1.0% error rate), then it is deemed to be error-prone. However, if processing element 202 outputs an incorrect value for y once every 10,000 transactions (i.e., a 0.01% error rate), then it is deemed to be error-free.

Furthermore, if input interconnect 204-1 corrupts at least one bit in a data packet in one out of 100 transmissions (i.e., 1.0% error rate), then it is deemed to be "error-prone". Furthermore, if input interconnect 204-1 only corrupts one bit in a data packet in one out of 10,000 transmissions (i.e., 0.01% error rate), then it is deemed to be "error-free".

Thus, in this example, the one or more processors further define the parameter criticalities for parameter weights stored in the first memory bank based on use of the error-prone processing elements and interconnects used in the first defined layer of the neural network, where parameter weights that are less critical to a correct model behavior of the neural network are processed, stored and transmitted using error-prone computing resources and parameter weights in the neural network. That is, if neuron 200 is using an input interconnect 204-1, an output interconnect 208, and/or a processing element 202 that is error-prone (as defined above), then a less critical parameter weight is used, since it is likely (1%) to be used by error-prone resources anyway. Thus, error-prone memory banks are used not only by layers in the DNN 500 that are closer to the input, but are also used with neurons that have poor (error-prone) processing/connection components.

In some embodiments of the present invention, one or more processors identify error-free processing elements and interconnects (e.g., processing elements and interconnects that are accurate more than 99.99% of the time) used in the second defined layer of the neural network. The one or more processors then further define the parameter criticalities for parameters weights stored in the second memory bank based on use of the error-free processing elements and interconnects used in the second defined layer of the neural network, where parameter weights that are more critical to a correct model behavior of the neural network are processed, stored and transmitted using error-free computing resources and parameter weights in the neural network. That is if certain neurons in the DNN 500 are error-free (as defined above), then they will use error-free memory banks to store the parameter weights that they will be using.

In some embodiments of the present invention, the neural network is a deep neural network that supports a deep learning model (i.e., a neural network that has a hidden layer of neurons).

In some embodiments of the present invention, parameter criticalities are determined based on an amount of change for each parameter weight across training iterations epochs. That is, assume that training data is run through DNN 500. Assume now that bits are intentionally flipped in certain portions of the training data, followed by a change to the parameter weights. That is, once the training data bits are flipped, the parameter weights are changed until a same output results. The greater the change to a parameter weight; the greater the parameter criticality of that parameter weight. That is, if a first parameter weight is doubled and a second parameter weight is tripled in order to arrive at the same output value from the DNN 500, then the second parameter weight is deemed to be more critical since it must be more greatly modified in order to achieve the same result.

In some embodiments of the present invention, a memory controller (e.g., memory controller 600 shown in FIG. 6) stores parameters weights in different memory banks according to parameter criticalities of the parameter weights. That is, parameter weights that are critical are stored in bank 604, while parameter weights that are non-critical are stored in bank 601.

In some embodiments of the present invention, the parameter weights are established by one or more processors modifying the incoming initial inputs; the neural network generating new outgoing final outputs based on the new incoming initial inputs; and one or more processor adjusting the parameter weights until the new outgoing final outputs match the original outgoing final outputs. That is, bits are flipped in the incoming data, and new parameter weights are tried out until the DNN 500 produces the same final output as originally output before flipping bits in the input data.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
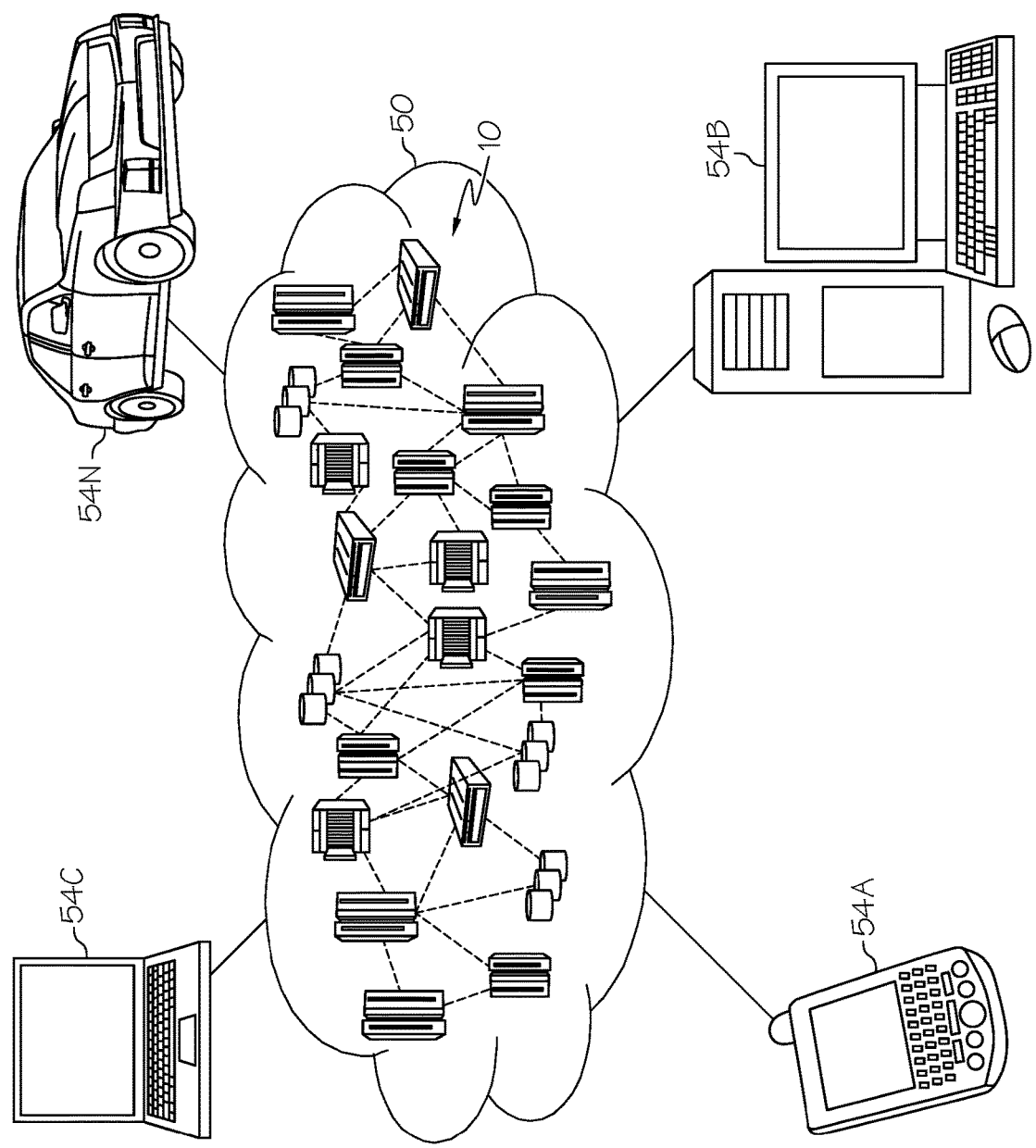
FIG. 8 depicts a cloud computing environment in accordance with one or more embodiments of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
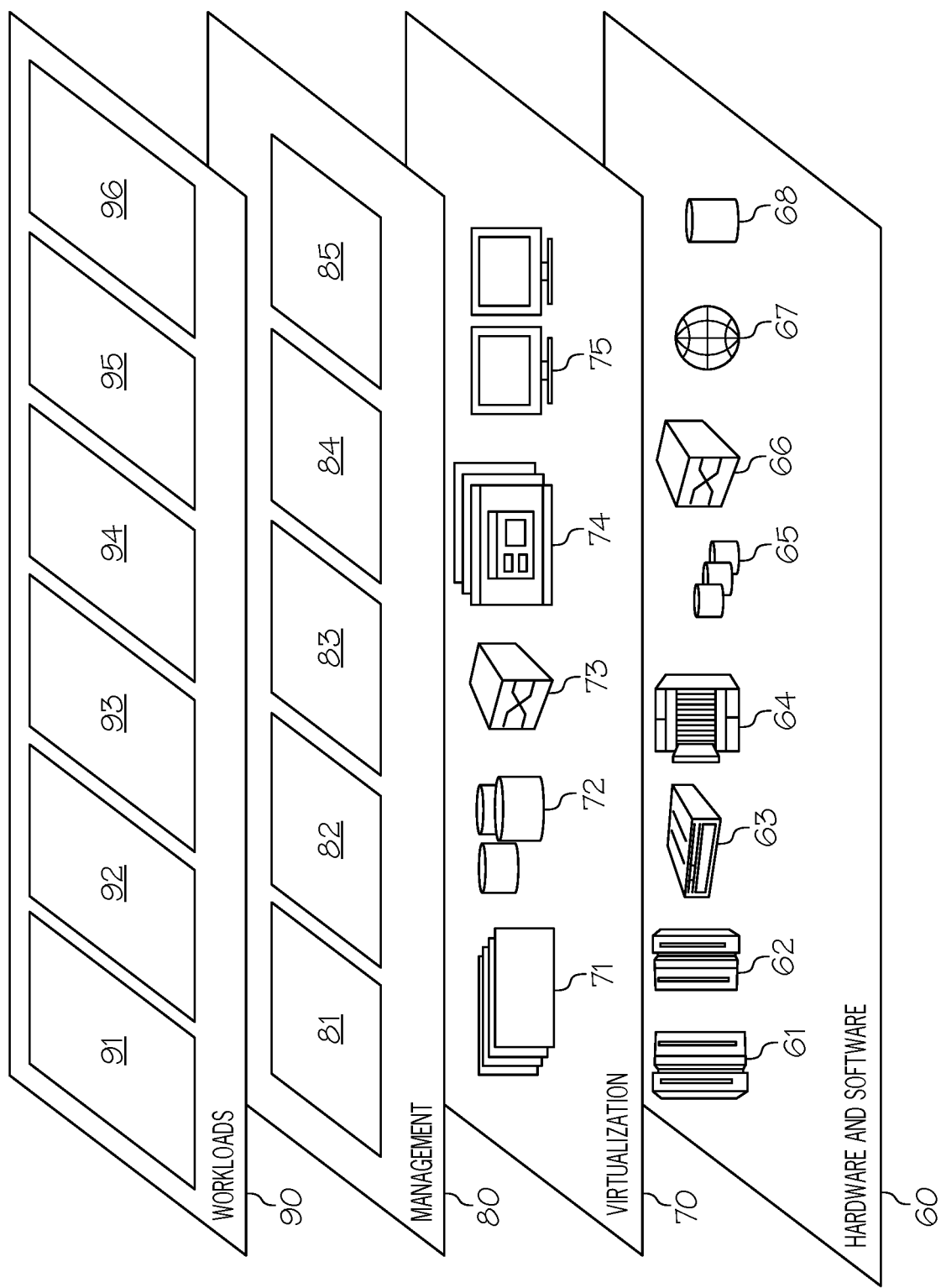
FIG. 9 depicts abstraction model layers of a cloud computing environment in accordance with one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and neural network processing 96, in accordance with one or more embodiments of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Hash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
defining, by one or more processors, layers in a neural network based on neuron locations relative to an initial input and a final output of the neural network, wherein neurons in the neural network are hardware processors, wherein a first layer in the neural network is closer to the initial input than a second layer in the neural network, and wherein the second layer is closer to the final output than the first layer;
defining, by one or more processors, parameter criticalities for all parameter weights used by the neural network based on the neuron locations relative to the initial input and the final output, wherein the parameter weights weight an impact that connections between neurons in the neural network have in determining the final output, and wherein the parameter criticalities define levels of impact that the parameter weights have on a final output of the neural network;
associating, by one or more processors, defined layers in the neural network with portions of memory based on defined parameter criticalities, wherein the first layer is assigned a first portion of memory that is more error-prone than a second portion of memory that is assigned to the second layer;
storing, by one or more processors, a first set of parameter weights used by neurons in the first layer in the first portion of memory;
storing, by one or more processors, a second set of parameter weights used by neurons in the second layer in the second portion of memory;
identifying, by one or more processors, error-prone processing elements and interconnects used in the first layer of the neural network;
further defining, by one or more processors, the parameter criticalities for the first set of parameter weights stored in the first portion of memory based on use of the error-prone processing elements and interconnects used in the first layer of the neural network, wherein parameter weights that are less critical to a correct model behavior of the neural network are processed, stored and transmitted using error-prone computing resources and parameter weights in the neural network;

identifying, by one or more processors, error-free processing elements and interconnects used in the second layer of the neural network; and further defining, by one or more processors, the parameter criticalities for the second set of parameter weights stored in the second portion of memory based on use of the error-free processing elements and interconnects used in the second layer of the neural network, wherein parameter weights that are more critical to a correct model behavior of the neural network are processed, stored and transmitted using error-free computing resources and said all parameter weights in the neural network.

2. The computer-implemented method of claim 1, wherein the first portion of memory uses less power than the second portion of memory.

3. The computer-implemented method of claim 1, wherein the neural network is a deep neural network that supports a deep learning model.

4. The computer-implemented method of claim 1, wherein the parameter criticalities are determined based on an amount of change for each parameter weight across training iterations epochs.

5. The computer-implemented method of claim 4, wherein an increase in a level of change to a particular parameter weight during training results in a proportional increase in a parameter criticality for the particular parameter weight.

6. The computer-implemented method of claim 1, further comprising:

storing, by a memory controller, parameter weights in different memory banks according to the parameter criticalities of the parameter weights.

7. The computer-implemented method of claim 1, wherein the parameter weights are established by:

modifying, by one or more processors, the initial input by flipping bits in the initial input;

generating, by the neural network, a new final output based on the modified initial input; and adjusting, by one or more processors, the parameter weights until the new final output matches the final output.

8. The computer-implemented method of claim 1, wherein the neural network comprises an input layer, a hidden layer, and an output layer, wherein the input layer has more neurons than the hidden layer, wherein the hidden layer has more neurons that the output layer, and wherein the computer-implemented method further comprises:

determining, by one or more processors, that a quantity of parameter weights used by the input layer exceeds a quantity of parameter weights used by the hidden layer; and in response to determining that the quantity of parameter weights used by the input layer exceeds the quantity of parameter weights used by the hidden layer, determining, by one or more processors, that each of the parameters weights used by the neurons in the input layer have less of an impact on the output layer than each of the parameter weights used by the neurons in the hidden layer such that each of the parameter weights used by the neurons in the input layer and each of the parameter weights used by the neurons in the hidden layer differently weight an impact on the final output of the neural network based on the hidden layer having fewer neurons and parameter weights than the input layer.

9. The computer-implemented method of claim 1, wherein the neural network comprises an input layer, a hidden layer, and an output layer, wherein the input layer has more neurons than the hidden layer, wherein the hidden layer has more neurons that the output layer, and wherein the computer-implemented method further comprises:

determining, by one or more processors, that there is an overlapping functionally between neurons in the input layer of the neural network based on to the input layer having more neurons than the hidden layer and the output layer; and in response to determining that there is the overlapping functionality between neurons in the input layer of the neural network based on to the input layer having more neurons than the hidden layer and the output layer, determining, by one or more processors, that the parameter weights used by neurons in the input layer have less of an impact on the final output of the neural network than parameter weights used by neurons in the hidden layer.

10. The computer-implemented method of claim 1, further comprising:

identifying, by one or more processors, a first quantity of neurons in the first layer in a neural network;

identifying, by one or more processors, a second quantity of neurons in the second layer in the neural network;

determining, by one or more processors, that the second quantity of neurons is greater than the first quantity of neurons; and in response to determining that the second quantity of neurons is greater than the first quantity of neurons, storing, by one or more processors, the first set of parameter weights for neurons in the first layer in the first portion of memory and storing, by one or more processors, the second set of parameter weights for neurons in the second layer in the second portion of memory.

11. The computer-implemented method of claim 1, wherein a parameter weight for a neuron in the first layer has less impact on a value of the final output than a neuron in the second layer.

12. A computer-implemented method comprising:

defining, by one or more processors, layers in a neural network based on neuron locations relative to an initial input and a final output of the neural network, wherein neurons in the neural network are hardware processors, wherein a first layer in the neural network is closer to the initial input than a second layer in the neural network, and wherein the second layer is closer to the final output than the first layer;

defining, by one or more processors, parameter criticalities for parameter weights based on the neuron locations relative to the initial input and the final output, wherein the parameter weights weight an impact that connections between neurons in the neural network have in determining the final output, wherein the parameter criticalities are determined based on an amount of change for each parameter weight across training iterations epochs, wherein an increase in a level of change to a particular parameter weight during training results in a proportional increase in a parameter criticality for the particular parameter weight, and wherein the parameter criticalities define levels of impact that the parameter weights have on a final output of the neural network;

associating, by one or more processors, defined layers in the neural network with portions of memory based on defined parameter criticalities, wherein the first layer is assigned a first portion of memory that is more error-prone than a second portion of memory that is assigned to the second layer;

storing, by one or more processors, parameter weights used by neurons in the first layer in the first portion of memory;

storing, by one or more processors, parameter weights used by neurons in the second layer in the second portion of memory.

13. A computer-implemented method comprising:

defining, by one or more processors, layers in a neural network based on neuron locations relative to an initial input and a final output of the neural network, wherein neurons in the neural network are hardware processors, wherein a first layer in the neural network is closer to the initial input than a second layer in the neural network, wherein the second layer is closer to the final output than the first layer wherein the neural network comprises an input layer, a hidden layer, and an output layer, and wherein the neural network is trained to identify a handwritten figure that is made up of a first set of multiple sections of the handwritten figure and a second set of multiple sections of the handwritten figure;

defining, by one or more processors, parameter criticalities for parameter weights based on the neuron locations relative to the initial input and the final output, wherein the parameter weights weight an impact that connections between neurons in the neural network have in determining the final output, and wherein the parameter criticalities define levels of impact that the parameter weights have on a final output of the neural network;

associating, by one or more processors, defined layers in the neural network with portions of memory based on defined parameter criticalities, wherein the first layer is assigned a first portion of memory that is more error-prone than a second portion of memory that is assigned to the second layer;

storing, by one or more processors, parameter weights used by neurons in the first layer in the first portion of memory;

storing, by one or more processors, parameter weights used by neurons in the second layer in the second portion of memory;

inputting the first set of multiple sections of the handwritten figure into a first set of neurons in the input layer;

inputting the second set of multiple sections of the handwritten figure into a second set of neurons in the input layer;

identifying, by the neural network, the handwritten figure using only the first set of multiple sections of the handwritten figure; and in response to the neural network identifying the handwritten figure using only the first set of multiple sections of the handwritten figure, determining, by one or more processors, that parameter weights associated with the second set of neurons in the input layer are inconsequential to the final output of the neural network.

14. A computer program product for optimizing a neural network, the computer program product comprising a non-transitory computer readable storage device having program instructions embodied therewith, the program instructions readable and executable by a computer to:

define layers in a neural network based on neuron locations relative to an initial input and a final output of the neural network, wherein neurons in the neural network are hardware processors, wherein a first layer in the neural network is closer to the initial input than a second layer in the neural network, and wherein the second layer is closer to the final output than the first layer;

define parameter criticalities for all parameter weights used by the neural network based on the neuron locations relative to the initial input and the final output, wherein the parameter weights weight an impact that connections between neurons in the neural network have in determining the final output, and wherein the parameter criticalities define levels of impact that the parameter weights have on a final output of the neural network;

associate defined layers in the neural network with portions of memory based on defined parameter criticalities, wherein the first layer is assigned a first portion of memory that is more error-prone than a second portion of memory that is assigned to the second layer;

store a first set of parameter weights used by neurons in the first layer in the first portion of memory;

store a second set of parameter weights used by neurons in the second layer in the second portion of memory;

identify error-prone processing elements and interconnects used in the first layer of the neural network;

further define the parameter criticalities for the first set of parameter weights stored in the first portion of memory based on use of the error-prone processing elements and interconnects used in the first layer of the neural network, wherein parameter weights that are less critical to a correct model behavior of the neural network are processed, stored and transmitted using error-prone computing resources and parameter weights in the neural network;

identify error-free processing elements and interconnects used in the second layer of the neural network; and further define the parameter criticalities for the second set of parameter weights stored in the second portion of memory based on use of the error-free processing elements and interconnects used in the second layer of the neural network, wherein parameter weights that are more critical to a correct model behavior of the neural network are processed, stored and transmitted using error-free computing resources and said all parameter weights in the neural network.

15. A system comprising:

one or more processors;

one or more computer readable memories operably coupled to the one or more processors; one or more computer readable storage mediums operably coupled to the one or more computer readable memories; and program instructions stored on at least one of the one or more computer readable storage mediums for execution by at least one of the one or more processors via at least one of the one or more computer readable memories, the program instructions comprising:

program instructions for defining layers in a neural network based on neuron locations relative to an initial input and a final output of the neural network, wherein neurons in the neural network are hardware processors, wherein a first layer in the neural network is closer to the initial input than a second layer in the neural network, and wherein the second layer is closer to the final output than the first layer;

program instructions for defining parameter criticalities for all parameter weights used by the neural network based on the neuron locations relative to the initial input and the final output, wherein the parameter weights weight an impact that connections between neurons in the neural network have in determining the final output, and wherein the parameter criticalities define levels of impact that the parameter weights have on a final output of the neural network;

program instructions for associating defined layers in the neural network with portions of memory based on defined parameter criticalities, wherein the first layer is assigned a first portion of memory that is more error-prone than a second portion of memory that is assigned to the second layer;

program instructions for storing a first set of parameter weights used by neurons in the first layer in the first portion of memory;

program instructions for storing a second set of parameter weights used by neurons in the second layer in the second portion of memory;

program instructions for identifying error-prone processing elements and interconnects used in the first layer of the neural network;

program instructions for further defining the parameter criticalities for the first set of parameter weights stored in the first portion of memory based on use of the error-prone processing elements and interconnects used in the first layer of the neural network, wherein parameter weights that are less critical to a correct model behavior of the neural network are processed, stored and transmitted using error-prone computing resources and parameter weights in the neural network;

program instructions for identifying error-free processing elements and interconnects used in the second layer of the neural network; and program instructions for further defining the parameter criticalities for the second set of parameter weights stored in the second portion of memory based on use of the error-free processing elements and interconnects used in the second layer of the neural network, wherein parameter weights that are more critical to a correct model behavior of the neural network are processed, stored and transmitted using error-free computing resources and said all parameter weights in the neural network.

* * * * *